United States Patent
Redding

(10) Patent No.: US 9,548,869 B2
(45) Date of Patent: Jan. 17, 2017

(54) SYSTEMS AND METHODS FOR IMPLEMENTING MULTICASTING USING PERSONAL AREA NETWORK "PAN" WIRELESS TECHNOLOGY

(75) Inventor: Brian A. Redding, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 13/441,771

(22) Filed: Apr. 6, 2012

(65) Prior Publication Data
US 2012/0257561 A1 Oct. 11, 2012

Related U.S. Application Data

(60) Provisional application No. 61/473,597, filed on Apr. 8, 2011.

(51) Int. Cl.
*H04L 12/18* (2006.01)
*H04W 4/00* (2009.01)
*H04W 4/06* (2009.01)

(52) U.S. Cl.
CPC .......... *H04L 12/1827* (2013.01); *H04W 4/008* (2013.01); *H04W 4/06* (2013.01)

(58) Field of Classification Search
None
See application file for complete search history.

(56) References Cited

U.S. PATENT DOCUMENTS

| | | | |
|---|---|---|---|
| 8,284,773 B1 * | 10/2012 | Woleben et al. | 370/390 |
| 8,687,536 B2 | 4/2014 | Michaelis | |
| 2003/0231629 A1 * | 12/2003 | Banerjee | H04L 12/1859 370/390 |
| 2004/0008679 A1 * | 1/2004 | Sinnarajah | H04W 72/005 370/390 |

(Continued)

FOREIGN PATENT DOCUMENTS

| | | |
|---|---|---|
| CN | 101331439 A | 12/2008 |
| CN | 101827313 A | 9/2010 |

(Continued)

OTHER PUBLICATIONS

Chang C T., et al., "TMCP: Two-layer Multicast Communication Protocol for Bluetooth Radio Networks", Computer Networks, Elsevier Science Publishers B.V., Amsterdam, NL, vol. 52, No. 14, Oct. 9, 2008, pp. 2764-2778, XP024339649.

(Continued)

*Primary Examiner* — Chirag Shah
*Assistant Examiner* — Rina Pancholi
(74) *Attorney, Agent, or Firm* — Kevin T. Cheatham

(57) ABSTRACT

Systems and methods for multicasting using Bluetooth low energy are described herein. In one embodiment, a first device advertises multicasting capabilities over one or more channels using a first type of advertising packet. One or more receiving devices scan the one or more channels for the first type of advertising packets to identify the first device as a multicasting capable device. Further, the one or more receiving devices request information from the first device as to the channel and timing of transmission of the multicasting data. The one or more receiving devices use the requested information to listen for the multicasting data on the appropriate channel.

20 Claims, 5 Drawing Sheets

(56) References Cited

U.S. PATENT DOCUMENTS

| | | | |
|---|---|---|---|
| 2004/0015995 A1* | 1/2004 | Shao | H04N 7/17318 |
| | | | 725/87 |
| 2005/0053119 A1* | 3/2005 | Day | H04L 63/12 |
| | | | 375/130 |
| 2005/0073966 A1* | 4/2005 | Kim et al. | 370/312 |
| 2005/0249141 A1* | 11/2005 | Lee et al. | 370/312 |
| 2006/0018319 A1* | 1/2006 | Palin et al. | 370/390 |
| 2007/0211665 A1 | 9/2007 | Yoshida et al. | |
| 2009/0080364 A1* | 3/2009 | Song et al. | 370/312 |
| 2009/0232041 A1* | 9/2009 | Smith | 370/312 |

FOREIGN PATENT DOCUMENTS

| | | |
|---|---|---|
| CN | 101998268 A | 3/2011 |
| JP | 2003244067 A | 8/2003 |
| JP | 2007243387 A | 9/2007 |
| WO | WO-2008103945 A1 | 8/2008 |

OTHER PUBLICATIONS

International Search Report and Written Opinion—PCT/US2012/032665—ISA/EPO—Aug. 8, 2012.
"Specification of the Bluetooth System, Core v4.0, vol. 1", Jun. 30, 2010, pp. 107-243, XP55016506, Retrieved from the Internet: URL:www.google.com [retrieved on Jan. 13, 2012] paragraph [3.3.2.1.2].

* cited by examiner

SYSTEMS AND METHODS FOR IMPLEMENTING MULTICASTING USING PERSONAL AREA NETWORK "PAN" WIRELESS TECHNOLOGY

CROSS REFERENCE TO RELATED APPLICATIONS

This application claims priority to U.S. Provisional No. 61/473,597, titled "SYSTEMS AND METHODS FOR IMPLEMENT MULTICASTING USING BLUETOOTH WIRELESS TECHNOLOGY," filed Apr. 8, 2011, which is hereby incorporated by reference in its entirety.

BACKGROUND

Field

This application relates generally to wireless communications, and more specifically to systems and methods for multicasting data using Personal Area Network (PAN) wireless technology.

Background

Bluetooth is a type of wireless technology usually used for exchanging data between devices over short distances such as in a personal area network (PAN). The PAN or body area networks in the Bluetooth standard may be defined by devices that have "paired" with each other and are therefore able to exchange data. Pairing is a process by which devices register with each other, including under user control. Once paired, devices typically can communicate with each other whenever they are within range and active without re-performing the pairing process.

Bluetooth devices may be limited as to the number of devices they can pair with, and therefore are limited as to the number of devices that a single Bluetooth device can send data to at a given time. Further, Bluetooth communications can include significant overhead for security and robustness, including the use of acknowledgments (ACKs and NAKs) sent by a party receiving data to the sender of the data to ensure receipt of the data.

In some cases it may be beneficial to use Bluetooth wireless technologies to send data, i.e., multicast, to a plurality devices, such as due to the power efficiency of Bluetooth wireless technologies. However, due to the limits of Bluetooth discussed above, such multicasting using Bluetooth wireless technologies is not directly supported in the Bluetooth standard. Therefore, new systems and methods are needed that support such multicasting.

SUMMARY

A summary of sample aspects of the disclosure follows. For convenience, one or more aspects of the disclosure may be referred to herein simply as "some aspects."

Methods and apparatuses or devices being disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the features being described provide advantages that include allowing for multicasting using Bluetooth wireless technologies.

One aspect of the disclosure provides a method for multicasting data in a personal area network. The method comprises advertising multicasting capabilities over a first channel in the personal area network. The method further comprises receiving a request for information about a multicasting channel including at least a channel map. The method further comprises transmitting a response to the request, the response comprising information about the multicasting channel. The method further comprises transmitting multicast packets over the multicasting channel according to the channel map.

Another aspect of the disclosure provides a method for multicasting data in a personal area network. The method comprises scanning a first channel in the personal area network for a device capable of multicasting data. The method further comprises transmitting a request for information about a multicasting channel to the device. The method further comprises receiving a response to the request, the response comprising information about the multicasting channel including at least a channel map. The method further comprises receiving multicast packets over the multicasting channel according to the channel map.

Another aspect of the disclosure provides an apparatus for transmitting multicasting data in a personal area network. The apparatus comprises a processor and a transceiver. The processor and transceiver are cooperatively configured to advertise multicasting capabilities over a first channel in the personal area network. The processor and transceiver are further cooperatively configured to receive a request for information about a multicasting channel. The processor and transceiver are further cooperatively configured to transmit a response to the request, the response comprising information about the multicasting channel including at least a channel map. The processor and transceiver are further cooperatively configured to transmit multicast packets over the multicasting channel according to the channel map.

Another aspect of the disclosure provides an apparatus for receiving multicasting data in a personal area network. The apparatus comprises a processor and a transceiver. The processor and transceiver are cooperatively configured to scan a first channel in the personal area network for a device capable of multicasting data. The processor and transceiver are further cooperatively configured to transmit a request for information about a multicasting channel to the device. The processor and transceiver are further cooperatively configured to receive a response to the request, the response comprising information about the multicasting channel including at least a channel map. The processor and transceiver are further cooperatively configured to receive multicast packets over the multicasting channel according to the channel map.

Another aspect of the disclosure provides a computer readable medium comprising instructions that, when executed, cause an apparatus to perform a method for multicasting data in a personal area network. The method comprises advertising multicasting capabilities over a first channel in the personal area network. The method further comprises receiving a request for information about a multicasting channel including at least a channel map. The method further comprises transmitting a response to the request, the response comprising information about the multicasting channel. The method further comprises transmitting multicast packets over the multicasting channel according to the channel map.

Another aspect of the disclosure provides a computer readable medium comprising instructions that, when executed, cause an apparatus to perform a method for multicasting data in a personal area network. The method comprises scanning a first channel in the personal area network for a device capable of multicasting data. The method further comprises transmitting a request for information about a multicasting channel to the device. The method further comprises receiving a response to the request, the response comprising information about the multicasting channel including at least a channel map. The method further comprises receiving multicast packets over the multicasting channel according to the channel map.

Another aspect of the disclosure provides an apparatus for transmitting multicasting data in a personal area network. The apparatus comprises means for advertising multicasting capabilities over a first channel in the personal area network. The apparatus further comprises means for receiving a request for information about a multicasting channel. The apparatus further comprises means for transmitting a response to the request, the response comprising information about the multicasting channel including at least a channel map. The apparatus further comprises means for transmitting multicast packets over the multicasting channel according to the channel map.

Another aspect of the disclosure provides an apparatus for receiving multicasting data in a personal area network. The apparatus comprises means for scanning a first channel in the personal area network for a device capable of multicasting data. The apparatus further comprises means for transmitting a request for information about a multicasting channel to the device. The apparatus further comprises means for receiving a response to the request, the response comprising information about the multicasting channel including at least a channel map. The apparatus further comprises means for receiving multicast packets over the multicasting channel according to the channel map.

DETAILED DESCRIPTION

Figure 1:
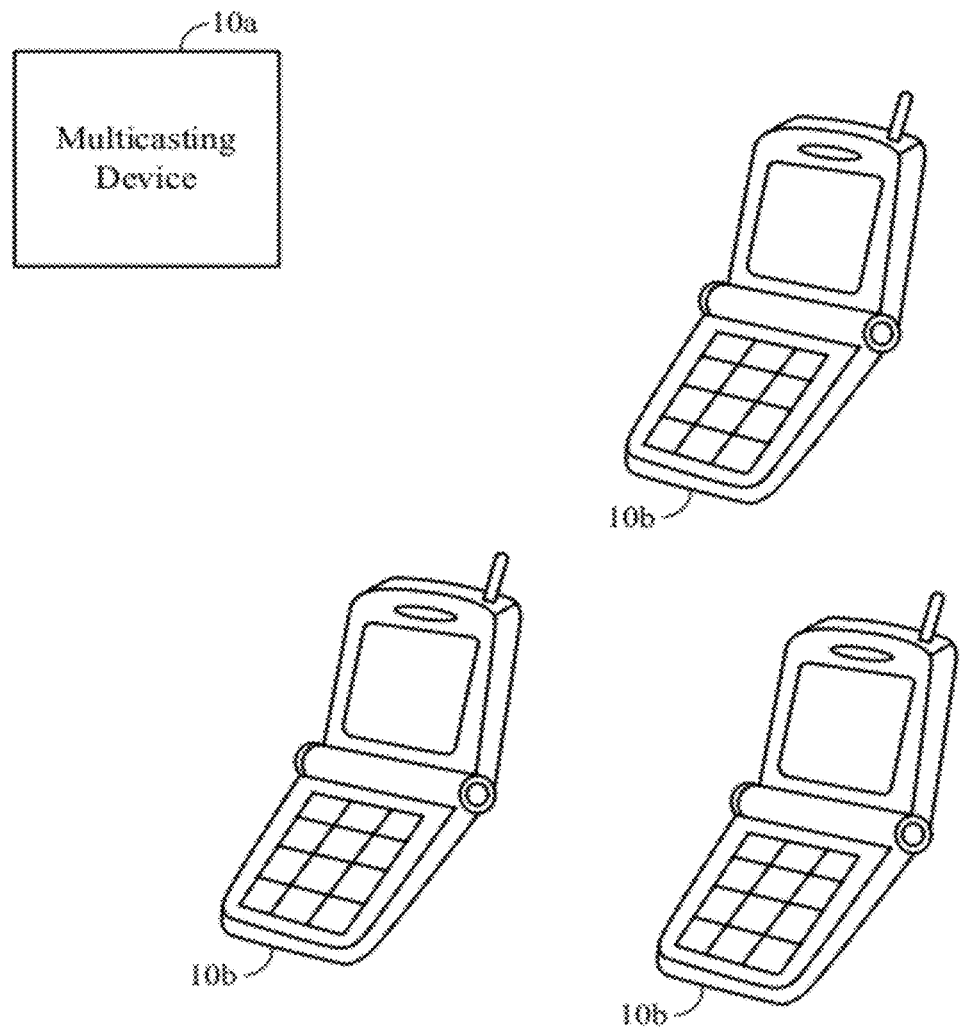
FIG. 1 illustrates an exemplary communications device multicasting data to a plurality of receiving devices.

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

The systems and methods described herein are described with respect to Bluetooth wireless technologies. The systems and methods may be particularly relevant to portions of the Bluetooth V4.0 standard relating to low energy communications, hereinafter referred to as Bluetooth low energy. However, one of skill in the art will recognize that the systems and methods may also be relevant to other similar wireless technologies including other versions of the Bluetooth standard. Details about the Bluetooth standard may be found in BLUETOOTH SPECIFICATION Version 4.0 [Vol 0], published Jun. 30, 2010, which is hereby expressly incorporated by reference.

Further, the systems and methods described herein may be implemented on a variety of different computing devices. These include general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. Further, the systems and methods may be implemented in mobile devices (e.g., phones, smartphones, Personal Digital Assistants (PDAs), Ultra-Mobile Personal Computers (UMPCs), Mobile Internet Devices (MIDs), etc.).

Currently, Bluetooth low energy restricts the device that has data to transmit (advertiser or slave device) from connecting to multiple receiving devices as currently the Bluetooth low energy has topology restrictions that only allow the advertiser or slave to connect to a single receiving device. Bluetooth low energy does have a broadcast capability, but such capability is not suited for multicasting. One reason is because the Bluetooth low energy broadcasting capability is limited to broadcasting on only 3 of the 36 communications channels defined in Bluetooth low energy. Therefore, such broadcasting capability is usually limited to discovering devices in order to form connections or pair devices in a PAN. Another reason that the Bluetooth low energy broadcasting capability is not suited for multicasting is due to the noisy communications environment (e.g., due to radio frequency (RF) signals) in which devices may be used. In such noisy environments, some of the communications channels may not be available due to interference, therefore further limiting the actual number of channels available for broadcasting to be less than 3.

FIG. 1 illustrates an exemplary communications device 10a multicasting data to a plurality of receiving devices 10b. Unlike standard Bluetooth low energy broadcasting, systems and methods described herein allow for multicasting using Bluetooth low energy advertising. Accordingly, a single device 10a can communicate data to a plurality of devices 10b using the systems and methods described herein. For example, the communications device 10a may comprise a heart-rate monitor sensor that may transmit heart-rate data to multiple devices 10b such as a watch, a phone, exercise equipment, etc. In another example, a 3D television may send sync information to a plurality of active 3D glasses (for example, hundreds of 3D glasses such as in a theater setting) in order to synchronize the timing of the shutter on the glasses and the display of 3D video on the television.

The systems and methods described herein are capable of scaling to allow multicasting to large numbers of devices as they allow for a number of receivers as well as, for example, at least 30% less overhead for transmission and reception to the first receiver as compared to traditional Bluetooth low energy, and no additional overhead for subsequent receivers.

Therefore, the number of receivers receiving the multicast has no effect on the overall bandwidth used to transmit data to the multiple receivers.

In one embodiment, the device 10a transmits a first type of advertising packet (e.g., an ADV_SCAN_IND packet of the Bluetooth standard) to advertise to devices 10b (e.g., scanning devices) the availability of the device 10a to multicast data. The first type of advertising packet may be sent, for example, according to the Bluetooth low energy broadcasting capability. The devices 10b, having received the first type of advertising packet, may then send a scan request packet (e.g., a SCAN_REQ packet of the Bluetooth standard) to the device 10a to get information on how to receive the multicast data from the device 10a. The device 10a may then send a response packet (e.g., a SCAN_RSP packet of the Bluetooth standard) to the devices 10b to provide the channel information (e.g., a channel map, a starting channel, offset (e.g., for syncing), a multicast ID, a time interval, etc.) for the device 10b to use to access the multicast data on one or more particular channels at given times, where the one or more channels may change at different time intervals.

The device 10b may listen on communications channels based on the channel information in the response packet for a second type of advertising packet, which may be referred to herein as a ADV_MCAST_IND packet, that includes the multicast data. In some embodiments, the device 10b does not acknowledge receipt of ADV_MCAST_IND packets from the device 10a, thereby reducing transmission overhead. The device 10a may turn on and off transmission of one or both of the first type of advertising packet and the second type of advertising packet at any time. For example, the device 10a may turn off such transmission to conserve power. In one embodiment, the device 10a may stop transmission of the first type of advertising packet if a maximum number of devices are receiving the multicast data. In one embodiment, the device 10a may stop transmission of the second type of advertising packet if there is not data to multicast.

Figure 2:
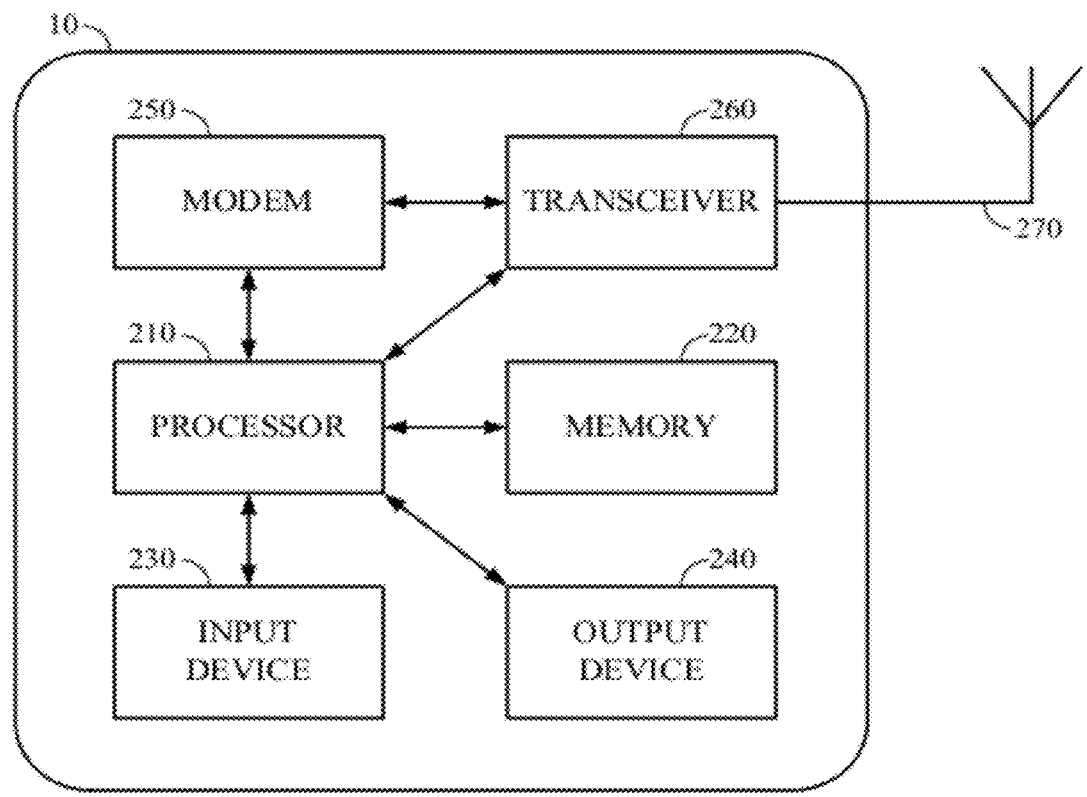
FIG. 2 is a functional block diagram of a wireless communication device.

FIG. 2 is a functional block diagram of a wireless communication device 10. Wireless communication device 10 may be representative of one or both of devices 10a and 10b discussed above with respect to FIG. 1. The wireless communication device 10 includes a processor 210 in data communication with a memory 220, an input device 230, and an output device 240. The processor is further in data communication with a modem 250 and a transceiver 260. The transceiver 260 is also in data communication with the modem 250 and an antenna 270. Although described separately, it is to be appreciated that functional blocks described with respect to the wireless communication device 10 need not be separate structural elements. For example, the processor 210 and memory 220 may be embodied in a single chip. Similarly, two or more of the processor 210, modem 250, and transceiver 260 may be embodied in a single chip.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses, to read information from or write information to memory 220. The processor may additionally, or in the alternative, contain memory, such as processor registers. The memory 220 can include processor cache, including a multi-level hierarchical cache in which different levels have different capacities and access speeds. The memory 220 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 is also coupled to an input device 230 and an output device 240 for, respectively, receiving input from and providing output to, a user of the wireless communication device 10. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, and haptic output devices, including force-feedback game controllers and vibrating devices.

The processor 210 is further coupled to a modem 250 and a transceiver 260. The modem 250 and transceiver 260 prepare data generated by the processor 210 for wireless transmission via the antenna 270 according to one or more air interface standards (e.g., Bluetooth low energy). The modem 250 and transceiver 260 also demodulate data received via the antenna 270 according to one or more air interface standards. The transceiver can include a transmitter, receiver, or both. In other embodiments, the transmitter and receiver are two separate components. The modem 250 and transceiver 260, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 3:
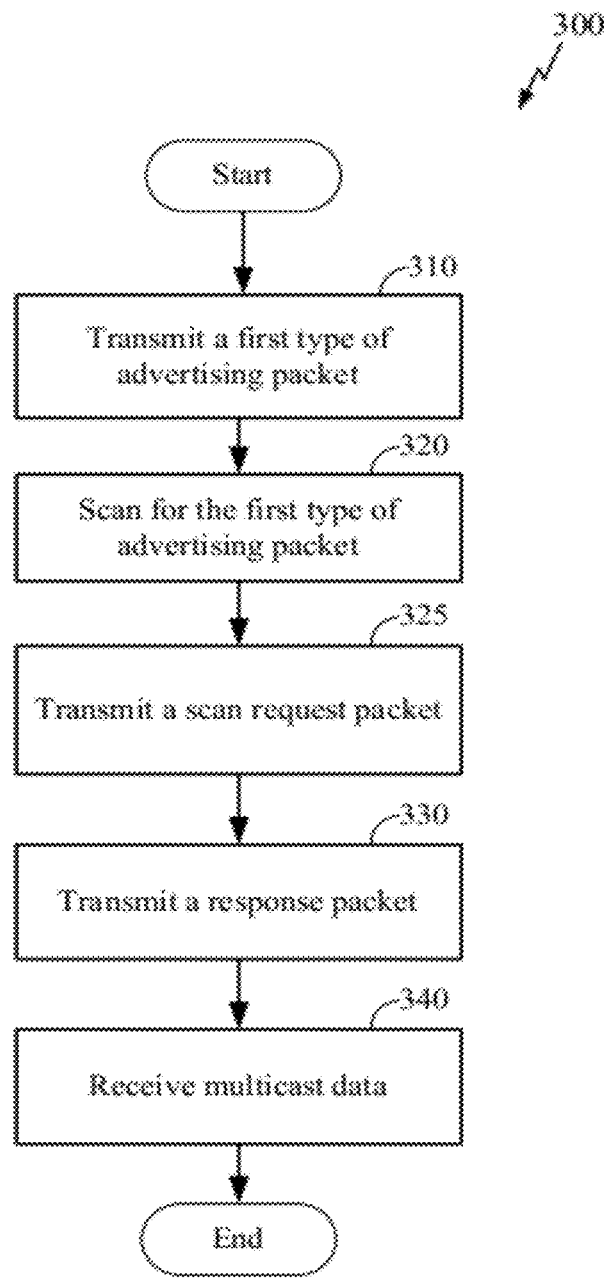
FIG. 3 is a flowchart illustrating an exemplary process for multicasting data from a device to a plurality of devices.

FIG. 3 is a flowchart illustrating an exemplary process 300 for multicasting data from a device 10a to a plurality of devices 10b. At 310, the device 10a transmits a first type of advertising packet (e.g., an ADV_SCAN_IND packet of the Bluetooth standard) over communications channels to advertise to the devices 10b (e.g., scanning devices) the availability of the device 10a to multicast data. The first type of advertising packet may be sent, for example, according to the Bluetooth low energy broadcasting capability. The first type of advertising packet may include information indicating that the device 10a is capable of transmitting and/or has data to transmit via multicasting to a plurality of devices. Further, the first type of advertising packet may include information indicating an identity of the device 10a (e.g., a universally unique identifier (UUID) and/or a device name). In one embodiment, the use of the ADV_SCAN_IND packet allows the standard advertising capabilities of Bluetooth lower energy to be used. Therefore, the first type of advertising packet may be sent over particular channels (e.g., 3 of the 36 channels in the Bluetooth low energy standard).

At 320, the devices 10b scan the channels over which the first type of advertising packet is sent, and receive the first type of advertising packet. The devices 10b are able to determine from the first type of advertising packet that multicast data is available from the device 10a.

Further at 325, the devices 10b that desire to receive the multicast data from the device 10a each transmit a scan request packet (e.g., a SCAN_REQ packet of the Bluetooth standard) to the device 10a to get information on how to receive the multicast data from the device 10a. The scan request packet may include information regarding an identity of the device 10b, an identity of the device 10a, or additional information.

Continuing at 330, the device 10a, upon receipt of the scan request packet, may send a response packet (e.g., a SCAN_RSP packet of the Bluetooth standard) to the devices 10b from which a scan request packet was received. The response packet may include information about the channel information (e.g., a channel map, a starting channel, offset (e.g., for syncing), a multicast ID, a time interval, etc.) for the device 10b to use to access the multicast data.

At 340, the device 10b may listen on communications channels based on the channel information in the response packet for a second type of advertising packet transmitted by the device 10a (it should be noted that the device 10a may be transmitting the second type of advertising packets at any time during the process 300, thereby allowing devices 10b with the correct channel information to receive multicast data), which may be referred to herein as a ADV_MCAST_IND packet, that includes the multicast data. For example, as discussed above, the response packet may include channel information (e.g., a channel map, a starting channel, offset (e.g., for syncing), a multicast ID, a time interval, etc.) that allows the device 10b to listen on the appropriate channel for multicast data. The device 10b may utilize the offset to determine at what time it should listen for an initial multicast data packet. Further, the device 10b may utilize the starting channel to determine at which frequency channel to listen for an initial multicast data packet. In addition, the device 10b may use the multicast ID to verify that data packets received at the initial multicast data packet received at the specified channel and time is a multicast data packet of the multicast from device 10a. The device 10b may further utilize the channel map to determine the sequence of channels on which the multicast data packets are sent. Accordingly, the device 10b may locate the starting channel in the sequence of channels in the channel map and determine the next channel to listen on to receive a next multicast data packet. The device 10b may further use the time interval given in the response packet to determine when to listen for the next packet after the previous packet is received. In some embodiments, the device 10b does not acknowledge receipt of ADV_MCAST_IND packets from the device 10a, thereby reducing transmission overhead.

In one embodiment, the second type of advertising packet includes a multicast ID associated with the one type of multicast data (e.g., 3D glasses sync data) transmitted by the device 10a. The multicast ID allows the device 10b to confirm what multicast the data received in the second type of advertising packet is associated with. The multicast ID may have a length of 2 octets. Further, in one embodiment, the second type of advertising packet comprises a payload including the multicast data. The payload may have a length of 0-35 octets.

One of ordinary skill in the art should recognize that for the process 300, various blocks or steps may be added or omitted without departing from the spirit or scope of the invention. Further, the blocks or steps do not necessarily have to be in the same order as shown in FIG. 3 and described above.

Figure 4:
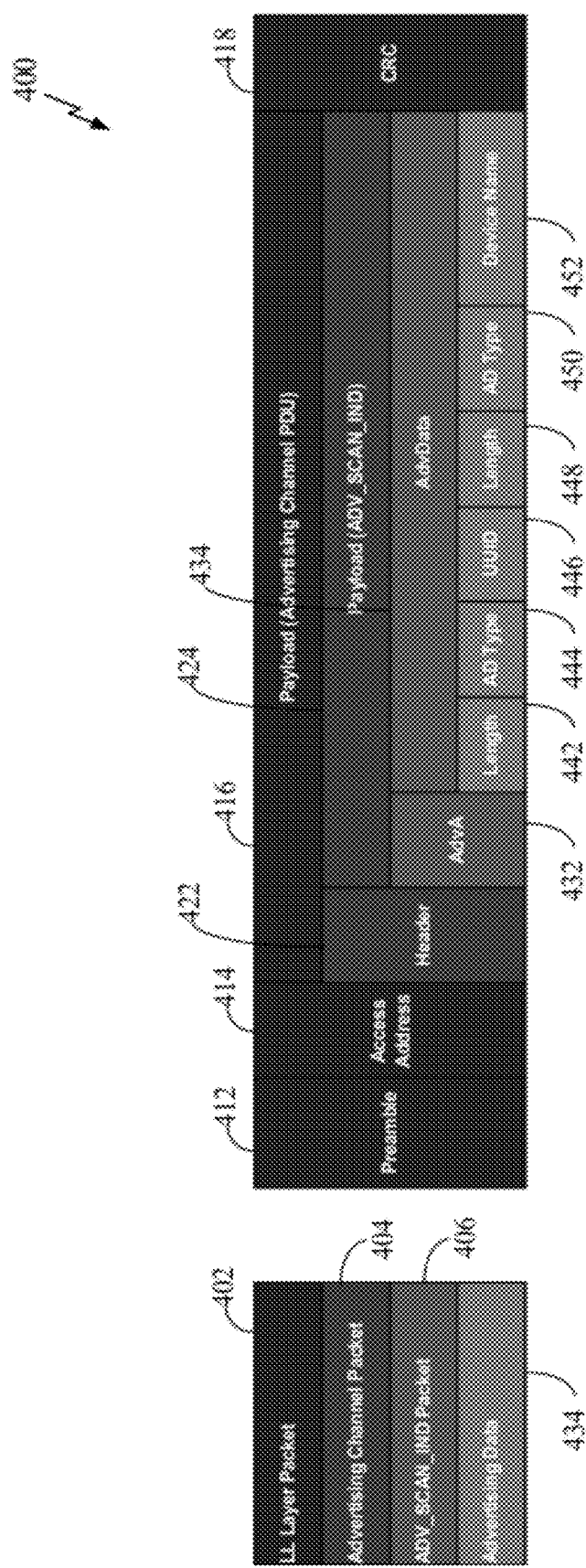
FIG. 4 illustrates an exemplary first type of advertising packet.

FIG. 4 illustrates an exemplary first type of advertising packet 400. As shown, the first type of advertising packet 400, which is a link level (LL) layer packet 402. The advertising packet 400 comprising a preamble 412, access address 414, payload 416, and a cycle redundancy check (CRC) 418. The payload 416 comprises an advertising channel packet 404 comprising a header 422 and a payload 424. The payload 424 comprises an ADV_SCAN_IND packet 406 comprising an advertising address (AdvA) 432 and advertising data (AdvData) 434. The advertising data 434 comprises a first length field 442, a first advertising data (AD) type 444, a UUID 446, a second length field 448, a second advertising data (AD) type 450, and a device name 452. As discussed above, the device 10a may transmit the first type of advertising packet 400 to devices 10b to indicate the availability of multicasting data to the devices 10b from the device 10a. The device 10b may utilize the UUID 446 and device name 452 to identify the device 10a.

Figure 5:
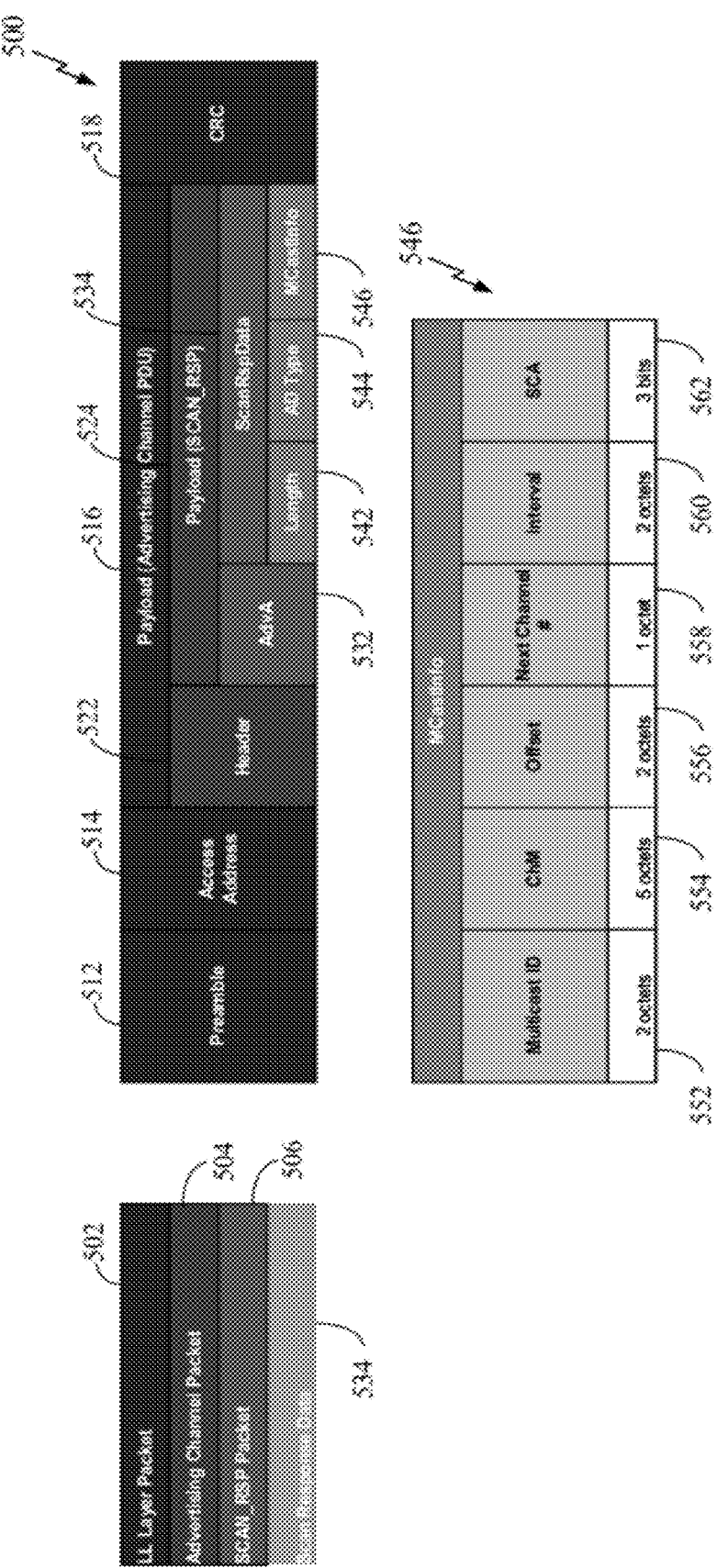
FIG. 5 illustrates an exemplary scan request packet.

FIG. 5 illustrates an exemplary scan request packet 500. As shown, the scan request packet 500 which comprises a link level (LL) layer packet 502 comprising a preamble 512, access address 514, payload 516, and a cycle redundancy check (CRC) 518. The payload 516 comprises an advertising channel packet 504 comprising a header 522 and a payload 524. The payload 524 comprises a SCAN_RSP packet 506 comprising an advertising address (AdvA) 532 and scan response data (ScanRspData) 534. The scan response data 534 comprises a length field 542, an advertising data (AD) type 544, and a multicasting information (MCastInfo) field 546.

The MCastInfo field 546 comprises a multicast ID 552. As discussed above, the multicast ID 552 provides a unique identifier to the device 10b that identifies the multicast data that is available from the device 10a. The multicast ID 552 may be 2 octets in length. The MCastInfo field 546 further comprises a channel map (ChM) field 554. The ChM field 554 may be a bit field indicating which channels (e.g., of the 36 channels used in Bluetooth low energy) are used by the device 10a to transmit the multicast data. The ChM field 554 may indicate that the device 10a transmits on certain channels at certain times, such as a channel hopping sequence. The ChM field 554 may have a length of 5 octets. The MCastInfo field 546 further comprises an offset field 556. The offset field 556 indicates an offset with respect to a clock timing (e.g., based on transmission of the scan request packet discussed above) synchronized between the device 10a and devices 10b at which the device 10a transmits the multicast data. The offset field 556 may have a length of 2 octets. The MCastInfo field 546 further comprises a next channel number field 558. The next channel number field 558 indicates which channel is being used next by the device 10a to transmit the multicast data at the offset indicated by the offset field 556. The next channel number field 558 may have a length of 1 octet. The MCastInfo field 546 further comprises an interval field 560. The interval field 560 indicates the amount of time between transmission of multicast packets by the device 10a. The interval field 560 may have a length of 2 octets. The MCastInfo field 546 further comprises a sleep clock accuracy (SCA) field 562. The SCA field 562 indicates the to the receiver device 10b an accuracy of the sleep clock on the device 10a. Accordingly, the device 10b can adjust the time it expects to receive multicast data from the device 10a based on potential inaccuracy in the sleep clock of the device 10a. The SCA field 562 may have a length of 3 bits. As discussed above, the device 10b may utilize this information to adjust the timing and frequency on which the device 10b looks for multicast data from the device 10a.

As discussed above, the systems and methods described herein provide certain advantages for multicasting data, including reduced overhead, which can lead to shorter timings for the transmission of multicasting data. In one embodiment, the maximum transmission time of an ADV_SCAN_IND packet is 376 μs. Further, a SCAN_REQ packet has a transmission time of 176 μs. The maximum transmission time of a SCAN_RSP packet is 376 μs. Further, to transmit the packets there needs to be a time period of no transmissions between packets herein referred to as the inter frame space (T_IFS). Thus requiring one T_IFS between the ADV_SCAN_IND and SCAN_REQ, and one between the SCAN_REQ and SCAN_RSP. Each T_IFS is 150 μs. Therefore, 300 μs (150×2) are required for T_IFS. Therefore, transmission of one of each of the ADV_SCAN_IND, SCAN_REQ, and SCAN_RSP packets, including the necessary T_IFSs, requires 1228 μs. Further, one advertising event may include transmission of 3 ADV_SCAN_IND, SCAN_REQ, and SCAN_RSP packets, requiring a T_IFS between transmission of each of the groups of ADV_SCAN_IND, SCAN_REQ, and SCAN_RSP packets. Therefore, one advertising event may take 3*1228 μs+2*150 μs=3.984 ms.

In addition, as discussed above, the ADV_MCAST_IND packet in one embodiment may include a multicast ID of 2 octets and a payload of 0-35 octets. In other embodiments, the multicast ID and the payload can have a different number of octets. Therefore, the maximum transmission time for the payload of the ADV_MCAST_IND packet is 296 μs. Further, the total timing required to transmit the ADV_MCAST_IND packet in a link level (LL) layer packet is 376 μs (296 μs+80 μs, where the 80 μs is due to LL advertising channel overhead). Further, the minimum interval between transmission of ADV_MCAST_IND packets may be 7.5 ms. Therefore, in the worst case, at least one advertising event can be interleaved between transmission of each ADV_MCAST_IND packet because 3.984 ms (for the advertising event) plus 0.376 ms for the ADV_MCAST_IND packet plus 2*0.150 ms for the required T_IFS is only 4.66 ms, which is less than the 7.5 ms minimum interval. Therefore, an advertising event can occur along with transmission of the multicast data.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for multicasting data in a personal area network, the method comprising:
    advertising, by a wireless device, multicasting capabilities in the personal area network;
    receiving, by the wireless device, a request for information about the multicasting capabilities;
    transmitting, by the wireless device, a response to the request, the response comprising information about the multicasting capabilities including at least a channel map and a time interval, the channel map indicating a channel hopping sequence of multicasting channels on which a corresponding sequence of multicast data packets will be sent by the wireless device, and the time interval indicating an amount of time between transmission of each of the data packets in the sequence corresponding to particular channel by the wireless device;
    transmitting, by the wireless device, the first corresponding multicast packet of the sequence of data packets according to a no-acknowledgement protocol over a first channel of the channel hopping sequence of multicasting channels according to the channel map and the time interval; and
    transmitting, by the wireless device, the second corresponding multicast packet of the sequence of data packets, after transmitting the first multicast packet, according to a no-acknowledgment protocol over a second channel of the channel hopping sequence of multicasting channels, according to the channel map and the time interval, the second channel being different from the first channel.

2. The method of claim 1, wherein the multicasting capabilities are advertised using a first type of advertising packet.

3. The method of claim 2, wherein the first and second multicast packets are of a second type of advertising packet.

4. The method of claim 1, wherein the information about the multicasting capabilities further includes at least one of: an offset, a starting channel, and a multicast identifier.

5. A method for multicasting data in a personal area network, the method comprising:
    scanning, by a first device, the personal area network for a second device capable of multicasting data;
    transmitting, by the first device, a request for information about receiving the multicasting data to the second device;
    receiving, by the first device, a response to the request, the response comprising information about receiving the multicasting data including at least a channel map and a time interval, the channel map indicating a channel hopping sequence of multicasting channels on which a corresponding sequence of multicast data packets will be sent, and the time interval indicating an amount of time between transmission of each of the data packets in the sequence corresponding to particular channel;
    receiving, by the first device, a first corresponding multicast packet of the sequence of multicast data packets over a first channel of the channel hopping sequence of multicasting channels according to the channel map and the time interval;
    determining, by the first device, when to listen for a second corresponding multicast packet of the sequence of multicast data packets, after receiving the first multicast packet, based upon the channel map and the time interval; and
    receiving, by the first device, the second corresponding multicast packet in the sequence of multicast data packets, after receiving the first multicast packet, over a second channel of the channel hopping sequence of multicasting channels according to the channel map and the time interval, the second channel being different from the first channel, the first and second multicast packets received according to a no-acknowledgement protocol.

6. The method of claim 5, wherein an indication of multicast capabilities of the device is received in a first type of advertising packet.

7. The method of claim 6, wherein the first and second multicast packets are of a second type of advertising packet.

8. The method of claim 5, wherein the information about the multicasting capabilities further includes at least one of: an offset, a starting channel, and a multicast identifier.

9. An apparatus for transmitting multicasting data in a personal area network, the apparatus comprising:
a processor; and
a transceiver, the processor and transceiver being cooperatively configured to:
advertise multicasting capabilities in the personal area network;
receive a request for information about the multicasting capabilities;
transmit a response to the request, the response comprising information about the multicasting capabilities including at least a channel map and a time interval, the channel map indicating a channel hopping sequence of multicasting channels on which a corresponding sequence of multicast data packets will be sent, and the time interval indicating an amount of time between transmission of each of the data packets in the sequence corresponding to particular channel by the apparatus;
transmit the first corresponding multicast packet of the sequence of data packets according to a no-acknowledgement protocol over a first channel of the channel hopping sequence of multicasting channels according to the channel map and the time interval; and
transmit the second corresponding multicast packet of the sequence of data packets, after transmitting the first multicast packet, according to a no-acknowledgment protocol over a second channel of the channel hopping sequence of multicasting channels according to the channel map and the time interval, the second channel being different from the first channel.

10. The apparatus of claim 9, wherein the multicasting capabilities are advertised using a first type of advertising packet.

11. The apparatus of claim 10, wherein the first and second multicast packets are of a second type of advertising packet.

12. The apparatus of claim 9, wherein the information about the multicasting capabilities further includes at least one of: an offset, a starting channel, and a multicast identifier.

13. An apparatus for receiving multicasting data in a personal area network, the apparatus comprising:
a processor; and
a transceiver, the processor and transceiver being cooperatively configured to:
scan the personal area network for a device capable of multicasting data;
transmit a request for information about receiving the multicasting data to the device;
receive a response to the request, the response comprising information about receiving the multicasting data including at least a channel map and a time interval, the channel map indicating a channel hopping sequence of multicasting channels on which a corresponding sequence of multicast data packets will be sent, and the time interval indicating an amount of time between transmission of each of the data packets in the sequence corresponding to particular channel;
receive a first corresponding multicast packet of the sequence of multicast data packets over a first channel of the channel hopping sequence of multicasting channels according to the channel map and the time interval;
determine when to listen for a second multicast packet of the multicast data packets, after receiving the first multicast packet, based upon the channel map and the time interval; and
receive the second corresponding multicast packet of the sequence of multicast packets, after receiving the first multicast packet, over a second channel of the channel hopping sequence of multicasting channels according to the channel map and the time interval, the second channel being different from the first channel, the first and second multicast packets received according to a no-acknowledgement protocol.

14. The apparatus of claim 13, wherein an indication of multicast capabilities of the device is received in a first type of advertising packet.

15. The apparatus of claim 14, wherein the first and second multicast packets are of a second type of advertising packet.

16. The apparatus of claim 13, wherein the information about the multicasting capabilities further includes at least one of: an offset, a starting channel, and a multicast identifier.

17. A non-transitory computer readable medium comprising instructions that, when executed, cause an apparatus to perform a method for multicasting data in a personal area network, the method comprising:
advertising multicasting capabilities in the personal area network;
receiving a request for information about the multicasting capabilities;
transmitting a response to the request, the response comprising information about the multicasting capabilities including at least a channel map and a time interval, the channel map indicating a channel hopping sequence of multicasting channels on which a corresponding sequence of multicast data packets will be sent, and the time interval indicating an amount of time between transmission of each of the data packets in the sequence corresponding to particular channel;
transmitting, the first corresponding multicast packet of the sequence of data packets according to a no-acknowledgement protocol over a first channel of the channel hopping sequence of multicasting channels according to the channel map and the time interval; and
transmitting the second corresponding multicast packet of the sequence of data packets, after transmitting the first multicast packet, according to a no-acknowledgment protocol over a second channel of the channel hopping sequence of multicasting channels according to the channel map and the time interval, the second channel being different from the first channel.

18. A non-transitory computer readable medium comprising instructions that, when executed, cause an apparatus to perform a method for multicasting data in a personal area network, the method comprising:

scanning the personal area network for a device capable of multicasting data;

transmitting a request for information about receiving the multicasting data to the device;

receiving a response to the request, the response comprising information about receiving the multicasting data including at least a channel map and a time interval, the channel map indicating a channel hopping sequence of multicasting channels on which a corresponding sequence of multicast data packets will be sent and the time interval indicating an amount of time between transmission of each of the data packets in the sequence corresponding to particular channel;

receiving, a first corresponding multicast packet of the sequence of multicast data packets over a first multicasting channel of the channel hopping sequence of multicasting channels according to the channel map and the time interval;

determining when to listen for a second multicast packet of the multicast data packets, after receiving the first multicast packet, based upon the channel map and the time interval; and receiving-the second corresponding multicast packet of the sequence of multicast data packets, after receiving the first multicast packet, over a second channel of the channel hopping sequence of multicasting channels according to the channel map and the time interval, the second channel being different from the first channel, the first and second multicast packets received according to a no-acknowledgement protocol.

19. An apparatus for transmitting multicasting data in a personal area network, the apparatus comprising:

means for advertising multicasting capabilities in the personal area network;

means for receiving a request for information about the multicasting capabilities;

means for transmitting a response to the request, the response comprising information about the multicasting capabilities including at least a channel map and a time interval, the channel map indicating a channel hopping sequence of multicasting channels on which a corresponding sequence of multicast data packets will be sent, and the time interval indicating an amount of time between transmission of each of the data packets in the sequence corresponding to particular channel;

means for transmitting, the first corresponding multicast packet of the sequence of data packets according to a no-acknowledgement protocol over a first channel of the channel hopping sequence of multicasting channels according to the channel map and the time interval; and means for transmitting the second corresponding multicast packet of the sequence of data packets, after transmitting the first multicast packet, according to a no-acknowledgment protocol over a second channel of the channel hopping sequence of multicasting channels according to the channel map and the time interval, the second channel being different from the first channel.

20. An apparatus for receiving multicasting data in a personal area network, the apparatus comprising:

means for scanning the personal area network for a device capable of multicasting data;

means for transmitting a request for information about receiving the multicasting data to the device;

means for receiving a response to the request, the response comprising information about receiving the multicasting data including at least a channel map and a time interval, the channel map indicating a channel hopping sequence of multicasting channels on which a corresponding sequence of multicast data packets will be sent and the time interval indicating an amount of time between transmission of each of the data packets in the sequence corresponding to particular channel;

means for receiving, a first corresponding multicast packet of the sequence of multicast data packets over a first channel of the channel hopping sequence of multicasting channels according to the channel map and the time interval;

means for determining when to listen for a second multicast packet of the multicast data packets, after receiving the first multicast data packet, based upon the channel map and the time interval; and means for receiving the second corresponding multicast packet of the sequence of data packets, after receiving the first multicast packet, over a second channel of the channel hopping sequence of multicasting channels according to the channel map and the time interval, the second channel being different from the first channel, the first and second multicast packets received according to a no-acknowledgement protocol.

\* \* \* \* \*